United States Patent
Iwata et al.

(10) Patent No.: US 10,425,797 B2
(45) Date of Patent: Sep. 24, 2019

(54) ON-VEHICLE EMERGENCY NOTIFICATION DEVICE

(71) Applicant: MAZDA MOTOR CORPORATION, Hiroshima (JP)

(72) Inventors: Kengo Iwata, Hiroshima (JP); Masanobu Kosaka, Kure (JP); Masahiro Kobayashi, Hiroshima (JP); Yuki Komazaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/763,719

(22) PCT Filed: Mar. 30, 2017

(86) PCT No.: PCT/JP2017/013270
§ 371 (c)(1),
(2) Date: Mar. 27, 2018

(87) PCT Pub. No.: WO2017/170871
PCT Pub. Date: Oct. 5, 2017

(65) Prior Publication Data
US 2018/0270640 A1    Sep. 20, 2018

(30) Foreign Application Priority Data
Mar. 30, 2016  (JP) .................. 2016-068350

(51) Int. Cl.
*H04M 11/04* (2006.01)
*H04M 1/66* (2006.01)
(Continued)

(52) U.S. Cl.
CPC .............. *H04W 4/90* (2018.02); *G07C 5/008* (2013.01); *G08B 25/016* (2013.01); *H04M 11/04* (2013.01); *H04W 4/44* (2018.02)

(58) Field of Classification Search
CPC ........... H04W 4/90; H04W 4/44; H04W 4/48; H04W 4/04; H04W 4/046; G07C 5/008;
(Continued)

(56) References Cited

U.S. PATENT DOCUMENTS 5,991,673 A * 11/1999 Koopman, Jr. ......... B60R 25/00
701/29.6
6,097,940 A * 8/2000 Sekiya .................. H04W 8/265
455/411

(Continued)

FOREIGN PATENT DOCUMENTS

JP    H11-250375 A    9/1999
JP    H11-255079 A    9/1999
(Continued)

OTHER PUBLICATIONS

Written Opinion issued in PCT/JP2017/013270; dated May 30, 2017.

(Continued)

*Primary Examiner* — Rafael Pérez-Gutiérrez
*Assistant Examiner* — Mark G. Pannell
(74) *Attorney, Agent, or Firm* — Studebaker & Brackett PC

(57) ABSTRACT

The present invention relates to an on-vehicle emergency notification device for performing a notification to an external emergency call center, in the event of an emergency. The on-vehicle emergency notification device is configured to allow a vehicle body number (VIN) and an emergency notification phone number (CIM number) to be registered therein in the form of a set, so as to enable the notification to the emergency call center, wherein the on-vehicle emergency notification device is configured such that: during execution of a factory mode for performing the registration of the vehicle body number and the emergency notification
(Continued)

phone number, rewriting of the vehicle body number is permitted; and, after the registration of the vehicle body number and the emergency notification phone number is completed and then the factory mode is shifted to a market mode, the rewriting of the vehicle body number is prohibited.

6 Claims, 5 Drawing Sheets

(51) Int. Cl.
*G01M 17/00* (2006.01)
*G06F 3/16* (2006.01)
*H04W 4/90* (2018.01)
*G07C 5/00* (2006.01)
*G08B 25/01* (2006.01)
*H04W 4/44* (2018.01)

(58) Field of Classification Search
CPC ....... H04M 11/04; G08B 25/08; G08B 21/00; B60R 21/00
USPC ...................................... 455/404.1
See application file for complete search history.

(56) References Cited

U.S. PATENT DOCUMENTS

| | | |
|---|---|---|
| 6,195,602 B1 | 2/2001 | Hazama et al. |
| 2003/0188303 A1* | 10/2003 | Barman .................. G06F 8/64 717/170 |
| 2005/0139664 A1* | 6/2005 | Yamagiwa ............ G06Q 30/02 235/385 |
| 2006/0202799 A1* | 9/2006 | Zambo .................... B60R 25/04 340/5.72 |
| 2008/0059806 A1* | 3/2008 | Kishida ................... G06F 21/35 713/186 |
| 2008/0071882 A1* | 3/2008 | Hering ................... G08G 1/017 709/217 |
| 2008/0155269 A1* | 6/2008 | Yoshikawa ........... H04L 9/3231 713/186 |
| 2009/0089068 A1* | 4/2009 | McKibbon ........... G06Q 30/018 705/317 |
| 2009/0271051 A1* | 10/2009 | Teramura ................ B60R 25/04 701/1 |
| 2010/0313132 A1* | 12/2010 | Link, II ................. B60K 35/00 715/727 |
| 2011/0264916 A1* | 10/2011 | Fischer .................. G07C 5/008 713/175 |
| 2017/0061707 A1* | 3/2017 | Ko .......................... G07C 5/008 |
| 2017/0279904 A1* | 9/2017 | Takemura ............... H04L 67/18 |

FOREIGN PATENT DOCUMENTS

| | | |
|---|---|---|
| JP | 2000-278885 A | 10/2000 |
| JP | 2012-027594 A | 2/2012 |

OTHER PUBLICATIONS

International Search Report issued in PCT/JP2017/013270; dated May 30, 2017.

An Office Action; "Notice of Reasons for Refusal," mailed by the Japanese Patent Office dated Nov. 13, 2017, which corresponds to Japanese Patent Application No. 2016-068350 with English language Concise Explanation.

* cited by examiner

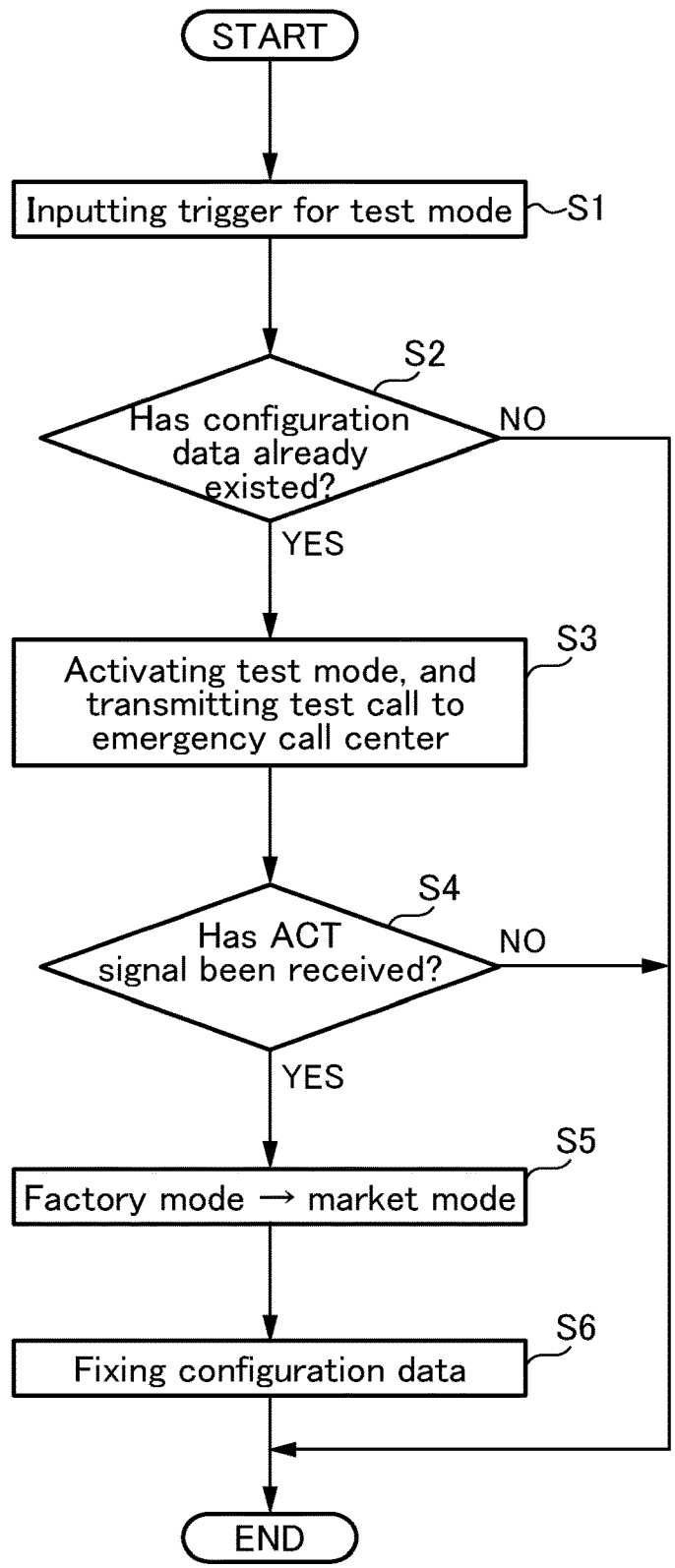

Factory mode

Factory mode

Factory mode

Market mode

ON-VEHICLE EMERGENCY NOTIFICATION DEVICE

TECHNICAL FIELD

The present invention relates to an on-vehicle emergency notification device, and more particularly to an on-vehicle emergency notification device for performing a notification to an external information center, in the event of an emergency regarding a vehicle or a vehicle occupant.

BACKGROUND ART

Heretofore, there has been known a technique of mounting an emergency notification device on a vehicle such as an automotive vehicle, wherein, in the event of an emergency such as traffic accident or sudden illness, a vehicle occupant can perform a notification to an emergency call center as an information center to ask for rescue contacts with rescue facilities such as a fire department, a police department and a medical center.

In this emergency notification device, vehicle body information such as a vehicle body number and an emergency notification phone number is preliminarily registered. Further, in the event of an emergency, vehicle location information and other information are automatically or manually notified to the emergency call center, together with the vehicle body information.

One example of this conventional on-vehicle emergency notification device is described in the following Patent Document 1. In the on-vehicle emergency notification device described in the Patent Document 1, when a user presses an emergency notification transmit button in the event of an emergency such as traffic accident, a notification is performed to an information center by a phone built into the device, and then when a communicable state with the information center is established, data such as a vehicle traveling direction and vehicle location information is transmitted to the information center, followed by a voice call.

Further, the on-vehicle emergency notification device described in the Patent Document 1 is configured to normally receive supply of electric power from a main battery of the vehicle. However, in the case where the vehicle undergoes a collision due to traffic accident or the like, the main battery itself can be damaged, or an interconnection can be disconnected, making it impossible to supply electric power from the main battery. Therefore, an auxiliary battery is built into the on-vehicle emergency notification device to enable the on-vehicle emergency notification device to receive the supply of electric power therefrom in place of the main battery.

CITATION LIST

Patent Document

Patent Document 1: 2000-278885A

SUMMARY OF INVENTION

Technical Problem

In the above conventional on-vehicle emergency notification device having the built-in phone for emergency notification, a third party can rewrite the vehicle body number registered in the device to wrongfully use the built-in phone. Examples of the wrongful use include performing an unnecessary notification to an emergency call center, and using the built-in phone for other purposes. As a means to prevent the wrongful use of the built-in phone, it is conceivable to prohibit rewriting of the vehicle body number registered in the on-vehicle emergency notification device, at a time of shipping from a vehicle manufacturing plant (vehicle factory).

However, there is a possibility that a defect of the on-vehicle emergency notification device is found at a dealer (distributor). In this case, if the rewriting of the vehicle body number is prohibited at the time of shipping from the vehicle factory, there arises a problem that the defective device cannot be replaced by another normal device, and the device after repairing the defect cannot be reused.

The present invention has been made in view of solving the above conventional problems, and an object thereof is to provide an on-vehicle emergency notification device capable of preventing a wrongful use of a built-in phone, and permitting rewriting of a vehicle body number even at a dealer or the like to provide enhanced convenience.

Solution to Technical Problem

In order to achieve the above object, the present invention provides an on-vehicle emergency notification device for performing a notification to an external information center, in the event of an emergency regarding a vehicle or a vehicle occupant. The on-vehicle emergency notification device is configured to allow a vehicle body number and an emergency notification phone number to be registered therein in the form of a set, so as to enable the notification to the information center, wherein the on-vehicle emergency notification device is configured such that: during execution of a factory mode for performing the registration of the vehicle body number and the emergency notification phone number, rewriting of the vehicle body number is permitted; and, after the registration of the vehicle body number and the emergency notification phone number is completed and then the factory mode is shifted to a market mode, the rewriting of the vehicle body number is prohibited.

In the on-vehicle emergency notification device of the present invention having this feature, during execution of the factory mode for performing the registration of the vehicle body number and the emergency notification phone number, the rewriting of the vehicle body number is permitted. Thus, in the case where the device has a defect, it is possible to replace the defective device by another normal device, and reuse the same device after repairing the defect, thereby providing enhanced convenience. Further, after the registration of the vehicle body number and the emergency notification phone number is completed and then the factory mode is shifted to a market mode, the rewriting of the vehicle body number is prohibited. Thus, the device can reliably prevent a wrongful use of the emergency notification phone by a third party.

Preferably, in the on-vehicle emergency notification device of the present invention, the factory mode is executed at a dealer, wherein the on-vehicle emergency notification device is configured such that, when the registration of the vehicle body number and the emergency notification phone number is completed at the dealer, the rewriting of the vehicle body number is prohibited.

According to this feature, when the factory mode is executed at a dealer, and the registration of the vehicle body number and the emergency notification phone number is completed at the dealer, the rewriting of the vehicle body number is prohibited. Thus, in the case where a defect of the device is found at the dealer, it is possible to replace the defective device by another normal device, and reuse the same device after repairing the defect, thereby providing enhanced convenience.

Preferably, the on-vehicle emergency notification device of the present invention is configured such that, when a power supply of the vehicle is in an ON state, and the registered vehicle body number is coincident with a vehicle body number acquired from a vehicle-side device, the notification to the information center is permitted.

According to this feature, when the power supply of the vehicle is in the ON state, and the registered vehicle body number is coincident with a vehicle body number acquired from a vehicle-side device, the notification to the information center is permitted, so that it becomes possible to prevent a wrongful use of the device.

Preferably, the on-vehicle emergency notification device of the present invention is configured such that, when the vehicle body number and the emergency notification phone number currently transmitted to the information center are coincident, respectively, with a vehicle body number and an emergency notification phone number preliminarily transmitted to the information center, a receipt signal indicative of receipt of the currently-transmitted vehicle body number and emergency notification phone number is received from the information center, and the factory mode is shifted to the market mode.

Preferably, the on-vehicle emergency notification device of the present invention comprises a state display indicator, wherein the on-vehicle emergency notification device is configured such that, when the vehicle body number and the emergency notification phone number currently transmitted to the information center are not coincident, respectively, with a vehicle body number and an emergency notification phone number preliminarily transmitted to the information center, a malfunction is indicated on the state display indicator.

Effect of Invention

The on-vehicle emergency notification device of the present invention is capable of preventing a wrongful use of the built-in phone, and permitting the rewriting of the vehicle body number even at a dealer or the like to provide enhanced convenience.

BRIEF DESCRIPTION OF DRAWINGS

FIG. 3 is a flowchart depicting a process of shifting from a factory mode to a market mode, in the on-vehicle emergency notification device according to this embodiment.

DESCRIPTION OF EMBODIMENTS

With reference to the drawings, an on-vehicle emergency notification device according to one embodiment of the present invention will now be described.

Figure 1:
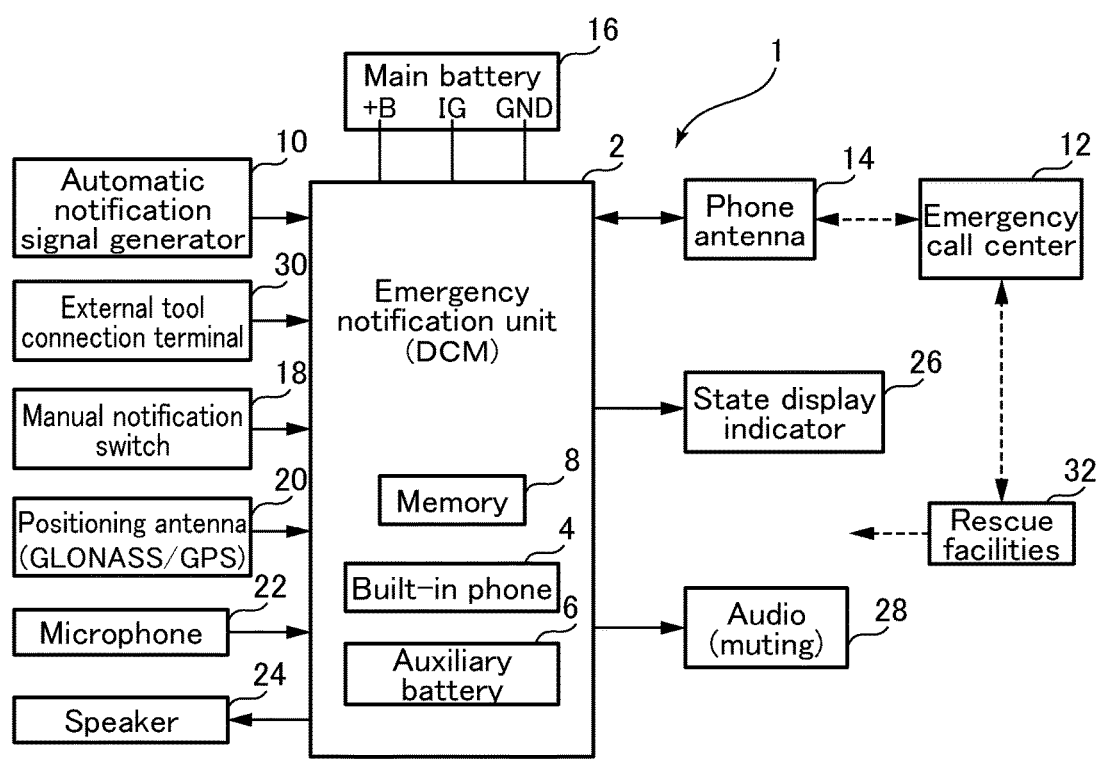
FIG. 1 is a block diagram depicting an overall configuration of an on-vehicle emergency notification device according to one embodiment of the present invention.

First of all, with reference to FIG. 1, an overall configuration of the on-vehicle emergency notification device according to this embodiment will be described. The reference sign 1 denotes the on-vehicle emergency notification device. This on-vehicle emergency notification device 1 comprises an emergency notification unit 2 as a main unit of the device. This emergency notification unit 2 is also called "DCM (Date Communication Module)", and is constructed such that an emergency notification built-in phone 4, an auxiliary battery 6, and a memory 8 for storing an aftermentioned vehicle body number and others, are built thereinto.

The on-vehicle emergency notification device 1 further comprises: an automatic notification signal generator 10 for generating an "automatic notification signal" in conjunction with activation of an airbag in the event of a vehicle accident such as a collision, and transmitting the automatic notification signal to the emergency notification unit 2; and a phone antenna 14 for performing a notification to an emergency call center 12 as an external information center, in the event of the vehicle accident.

The on-vehicle emergency notification device 1 is connected to a vehicle-mounted main battery 16, and configured to be supplied with electric power therefrom. This main battery 16 has a+B power source, an IG power source, and a GND (EARTH).

To the emergency notification unit (DCM) 2, a manual notification switch 18 for manually performing a notification to the emergency call center 12, and a positioning antenna 20 for receiving radio waves from positioning satellites such as GPSs (Japan, USA, etc.) or GLONASSs (Russia) to measure a current location, are connected. Further, a microphone 22 and a speaker 24 are also connected to the emergency notification unit (DCM) 2 to enable a conversation with the emergency call center 12 via the built-in phone 4.

The emergency notification unit (DCM) 2 connects to a state display indicator 26 for displaying various states regarding an aftermentioned emergency notification. The emergency notification unit (DCM) 2 also connects to a vehicle-mounted audio 28 which is configured to be muted during notification to the emergency call center 12.

Further, the emergency notification unit (DCM) 2 is provided with an external tool connection terminal 30 which is configured to allow an external tool for executing an aftermentioned test mode, or the like, to be connected thereto.

The emergency call center 12 is capable of transferring the notification to rescue facilities 32 such as a fire department, a police department and a medical center so as to deal with the accident.

Figure 2:
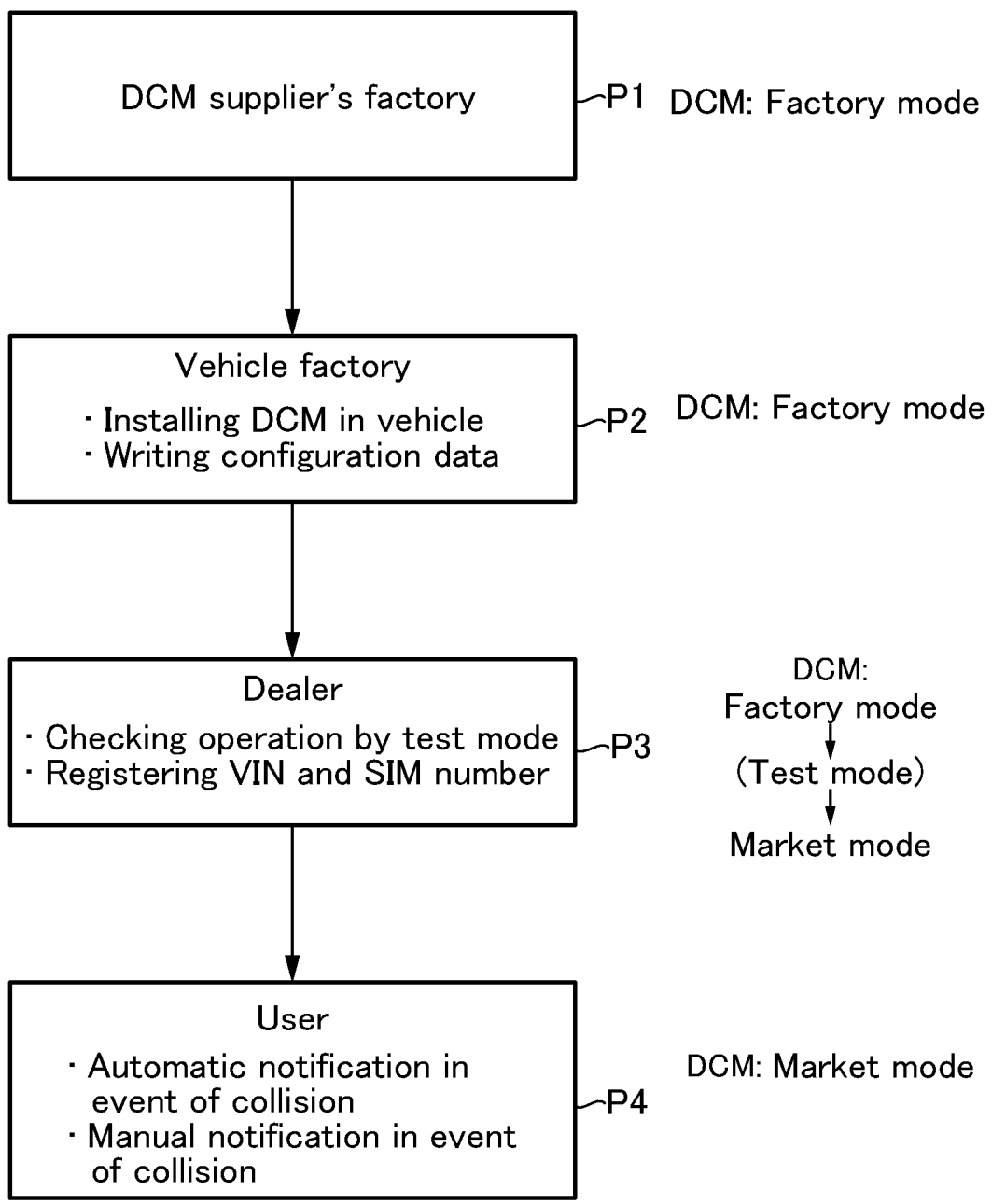
FIG. 2 is a flowchart depicting a flow from a supplier's factory to a user through a vehicle factory and a dealer, in the on-vehicle emergency notification device according to this embodiment.

Next, with reference to FIG. 2, a flow from a supplier's factory to a user through a vehicle factory and a dealer (distributor) in the on-vehicle emergency notification device 1 will be described. In FIG. 2, the reference sign "P" denotes step.

First of all, in P1, the emergency notification unit (DCM) 2 of the on-vehicle emergency notification device 1 is shipped from a factory of a supplier as a manufacturer of the DCMs 2 to a vehicle factory of a manufacturer of automobile vehicles. At a time of shipping from the supplier's factory, the DCM 2 is set in a "factory mode" in which a vehicle body number and others are rewritable.

Then, in P2, at the vehicle factory, the emergency notification unit (DCM) 2 is installed in a vehicle, and configuration data such as "vehicle body number", "vehicle type", "fuel type (gasoline, light oil)", and "vehicle body type" is written into the DCM 2.

This embodiment will be described based on one example in which a vehicle identification number (VIN) is used as the "vehicle body number".

Then, in P3, at the dealer, a test mode is executed. This test mode is intended to check whether or not the emergency notification unit (DCM) 2 of the emergency notification device 1 normally operates. After the DCM 2 is subjected to various checking operations under this test mode, and then goes through a given step, the VIN and an emergency notification phone number (CIM number) are registered. As a result, the "factory mode" is changed to a "market mode" in which the rewriting of the vehicle body number is prohibited.

Last of all, in P4, the vehicle is delivered to a user. Therefore, in the event of a traffic accident during driving of the vehicle by the user (driver), the collision accident is notified to the emergency call center 12, automatically or manually by the user.

On the other hand, in the event of sudden illness of a vehicle occupant, the user (vehicle occupant) of the vehicle can also perform a notification to the emergency call center 12, using the manual notification switch 18.

During the automatic or manual notification, in addition to the vehicle body number (VIN) and the emergency notification phone number (CIM number), vehicle location information, the remaining configuration data and others are transmitted to the emergency call center 12.

Next, with reference to FIG. 3, a process of shifting from the factory mode to the market mode in the on-vehicle emergency notification device 1, to be executed at the dealer, will be specifically described. In FIG. 3, the reference sign "S" denotes step.

In S1 depicted in FIG. 3, a trigger for the test mode is input. For example, this trigger for the test mode is a manipulation capable of triggering execution of the test mode, such as manipulating another device (e.g., turn indicator lever) of the vehicle in a given sequence and by a given number of times. In the case where the dealer has an external tool for the test mode, this external tool may be connected to the external tool connection terminal 30 of the emergency notification unit (DCM) 2 to execute the test mode. In this case, the S1 is omitted.

Subsequently, the process proceeds to S2. In the S2, it is determined whether or not the configuration data has been input into the DCM 2. When the configuration data is determined to have been input, the process proceeds to S3.

In the S3, the test mode is activated to perform given checking operations. When there is not any defect or the like, the "vehicle body number (VIN)" and the "emergency notification phone number" are transmitted to the emergency call center 12. Subsequently, the process proceeds to S4. In the S4, it is determined whether or not the DCM 2 has received an "ACT signal" from the emergency call center 12. In this embodiment, the ACT signal means a "receipt signal indicative of receipt of the vehicle number and the emergency notification phone number" transmitted from the emergency call center 12.

In this case, information about the vehicle number, the emergency notification phone number and others was preliminarily transmitted to the emergency call center 12. Thus, when currently-received information is coincident with the preliminarily-acquired information, the emergency call center 12 transmits the ACT signal.

When the ACT signal is determined to have been received, the process proceeds to S5. In the S5, the factory mode is shifted to the market mode. Subsequently, the process proceeds to S6. In the S6, the configuration data is fixed, i.e., registered, although details thereof will be described later. Specifically, the same vehicle body number (VIN) and emergency notification phone number as those transmitted to the emergency call center 12 are registered in the form of a set.

In the on-vehicle emergency notification device 1 according to this embodiment, a vehicle body number (VIN) is registered in the emergency notification unit 2, and, after shifting to the market mode, a vehicle body number acquired from a vehicle-side device is checked against the registered vehicle body number, to thereby prevent the device from being wrongly used. Therefore, in the on-vehicle emergency notification device 1, rewriting of a vehicle body number is prohibited during the market mode.

Figure 4A:
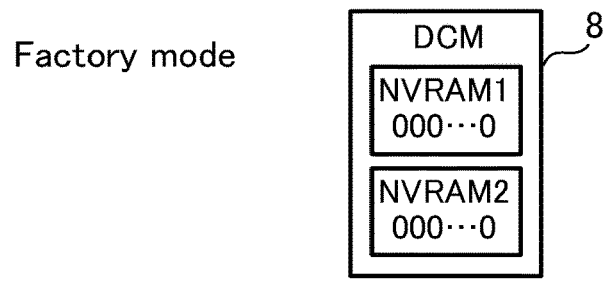
FIG. 4A is a diagram depicting a procedure for prohibiting rewriting of a vehicle body number in a memory during the market mode, in the on-vehicle emergency notification device according to this embodiment.

With reference to FIGS. 4A to 4D, a procedure for prohibiting rewriting of a vehicle body number in the memory during the market mode will be described. First of all, as depicted in FIG. 4A, the memory 8 of the emergency notification unit (DCM) 2 comprises a "vehicle information-recording NVRAM 1" and an "emergency call center transmit data-storing NVRAM 2" each for storing therein information such as a vehicle body number. In the supplier's factory for manufacturing the emergency notification unit 2, the emergency notification unit 2 is set in the "factory mode", and all bits in each of the "vehicle information-recording NVRAM 1" and the "emergency call center transmit data-storing NVRAM 2" are set to zero.

Figure 4B:
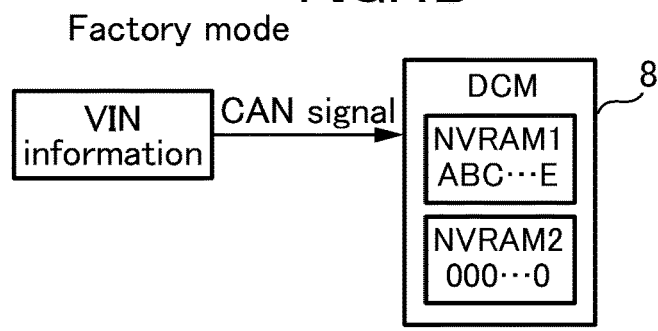
FIG. 4B is a diagram depicting the procedure for prohibiting the rewriting of the vehicle body number in the memory during the market mode, in the on-vehicle emergency notification device according to this embodiment.

Subsequently, as depicted in FIG. 4B, when the DCM 2 receives a CAN signal containing a vehicle body number (VIN information) from a vehicle-side device, and a given updating condition is satisfied, the "vehicle information-recording NVRAM 1" is updated (rewritten).

Figure 4C:
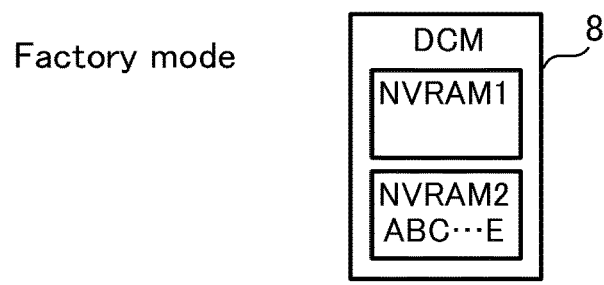
FIG. 4C is a diagram depicting the procedure for prohibiting the rewriting of the vehicle body number in the memory during the market mode, in the on-vehicle emergency notification device according to this embodiment.

Subsequently, as depicted in FIG. 4C, when, as a result of execution of the test, it has been confirmed that operation of the DCM 2 is normal, a value of the vehicle body number in the "emergency call center transmit data-storing NVRAM 2" is set to become coincident with a value (ABC—E) of the vehicle body number in the "vehicle information-recording NVRAM 1", and the "emergency call center transmit data-storing NVRAM 2" is set to be unrewritable. After this, the "factory mode" is shifted to the "market mode".

Figure 4D:
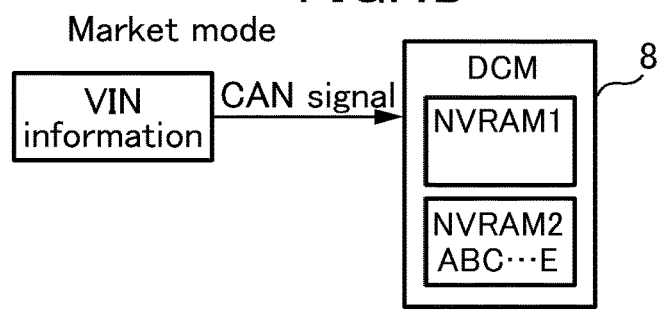
FIG. 4D is a diagram depicting the procedure for prohibiting the rewriting of the vehicle body number in the memory during the market mode, in the on-vehicle emergency notification device according to this embodiment.

Subsequently, as depicted in FIG. 4D, in the "market mode", the DCM 2 receives a CAN signal containing VIN information (vehicle body number) from a vehicle-side device, and, after writing the received vehicle body number into the "vehicle information-recording NVRAM 1", compares the written vehicle body number with the vehicle body number in the "emergency call center transmit data-storing NVRAM 2". When the two vehicle body numbers are coincident with each other, the emergency notification unit 2 normally operates to automatically or manually perform a notification. On the other hand, when the two vehicle body numbers are not coincident with each other, the emergency notification unit 2 operates to indicate "malfunction" on the state display indicator 26, and prohibit the automatic or manual notification to the emergency call center 12.

Figure 5:
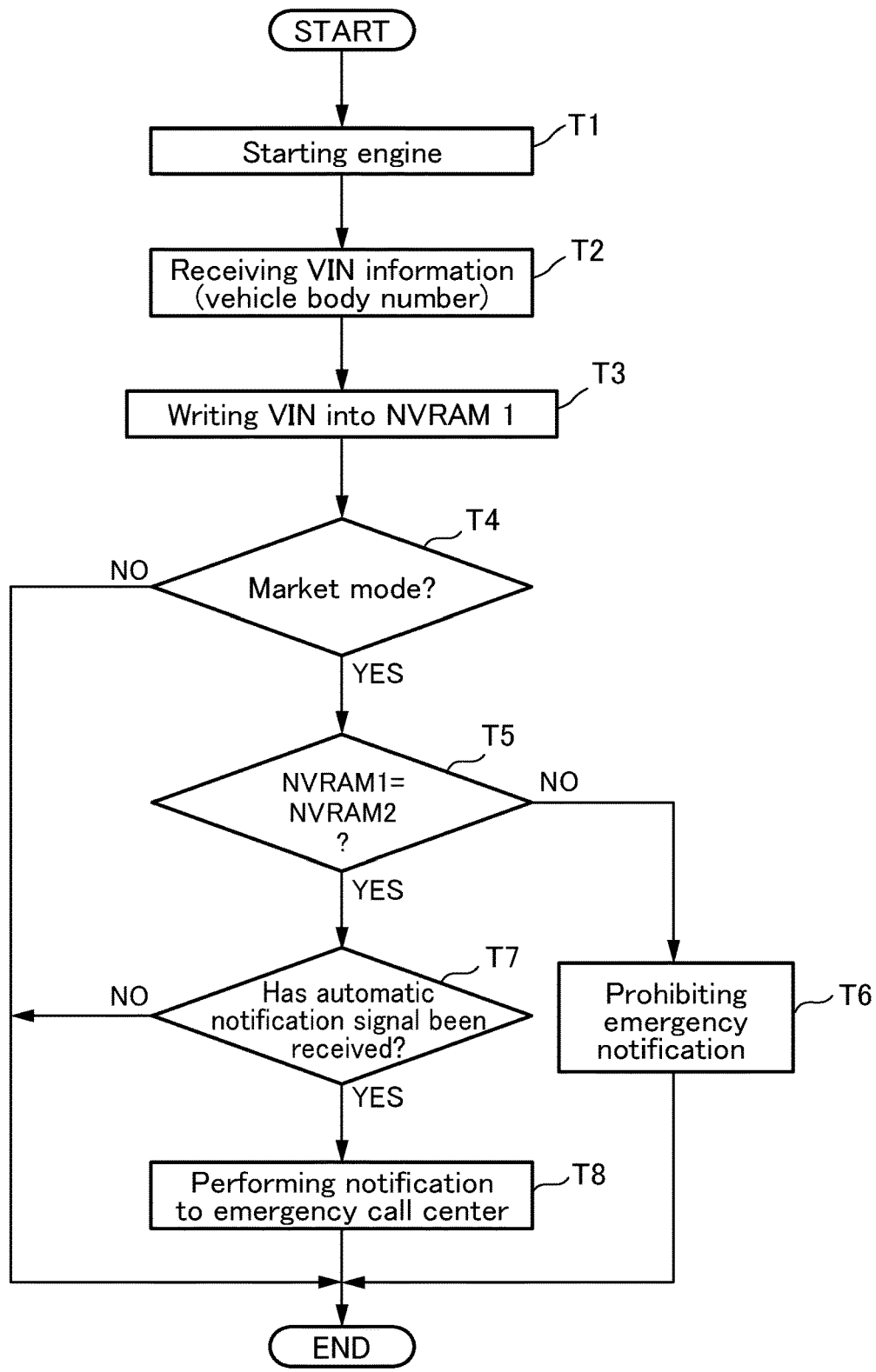
FIG. 5 is a flowchart depicting a process of prohibiting the rewriting of the vehicle body number during the market mode, in the on-vehicle emergency notification device according to this embodiment.

Next, with reference to FIG. 5, the operation of the on-vehicle emergency notification device 1 according to this embodiment will be described. In FIG. 5, the reference sign "T" denotes step.

First of all, in T1, a user (driver) turns on the power supply of the vehicle, specifically the Ig power supply, to start an engine. Then, the operation proceeds to T2. Upon start of the engine, VIN information including a vehicle body number (VIN) is received from a vehicle-side device. Subsequently, the operation proceeds to T3. In the T3, the received vehicle body number (VIN) is written into the "vehicle information-recording NVRAM 1" of the memory 8.

Subsequently, the operation proceeds to T4. In the T4, it is determined whether or not the on-vehicle emergency notification device 1 is in the "market mode". When the on-vehicle emergency notification device 1 is determined to be in the "market mode", the operation proceeds to T5. On the other hand, when the on-vehicle emergency notification device 1 is determined to be not in the "market mode", i.e., to be in the "factory mode", the operation is terminated.

In the T5, it is determined whether or not the vehicle body number (VIN) currently written into and stored in the "vehicle information-recording NVRAM 1" is coincident with the vehicle body number (VIN) stored in the "emergency call center transmit data-storing NVRAM 2".

In the T5, if the two vehicle body numbers are determined to be not coincident with each other, there is a possibility that the built-in phone 4 of the emergency notification unit (DCM) 2 is wrongly used. Thus, in order to prevent the wrongful use, the operation proceeds to T6. In the T6, a warning lamp is blinked on the state display indicator 26, and the notification to the emergency call center 12 is prohibited.

On the other hand, when the two vehicle body numbers are determined, in the T5, to be coincident with each other, the operation proceeds to T7. In the T7, it is determined whether or not the automatic notification signal has been received from the automatic notification signal generator 10. When the automatic notification signal is determined to have been received, the operation proceeds to T8. In the T8, a notification for notifying the emergency call center 12 of an emergency such as accident is performed. During this notification, in addition to the vehicle body number (VIN) and the emergency notification phone number (CIM number), vehicle location information, the remaining configuration data and others are transmitted to the emergency call center 12, as mentioned above.

In the T7, in the event of sudden illness or the like, it may be determined whether or not VIN information including a vehicle body number (VIN) from a vehicle-side device has been received via the manual notification switch 18. In this case, as with the case where the automatic notification signal has been received, the operation proceeds to the T8, and, in the T8, a notification for notifying the emergency call center 12 of an emergency is performed.

Next, functions/advantageous effects of the on-vehicle emergency notification device according to this embodiment will be described. The on-vehicle emergency notification device 1 according to this embodiment is designed to perform a notification to the external emergency call center 12, in the event of an emergency regarding a vehicle or a vehicle occupant. In the on-vehicle emergency notification device 1 according this embodiment, during execution of the "factory mode" for performing registration of a vehicle body number (VIN) and an emergency notification phone number (CIM number), the rewriting of the vehicle body number is permitted. Thus, in the case where the device has a defect, it is possible to replace the defective device by another normal device, and reuse the same device after repairing the defect, thereby providing enhanced convenience. Further, after the registration of the vehicle body number and the emergency notification phone number is completed and then the factory mode is shifted to a market mode, the rewriting of the vehicle body number is prohibited. Thus, the device can reliably prevent a wrongful use of the emergency notification phone by a third party.

In the on-vehicle emergency notification device 1 according this embodiment, when the "factory mode" is executed at a dealer, and the registration of the vehicle body number and the emergency notification phone number is completed at the dealer, the rewriting of the vehicle body number is prohibited. Thus, in the case where a defect of the device is found at the dealer, it is possible to replace the defective device by another normal device, and reuse the same device after repairing the defect, thereby providing enhanced convenience.

In the on-vehicle emergency notification device 1 according this embodiment, when the power supply of the vehicle is in the ON state (the Ig power supply is in the ON state) and the registered vehicle body number is coincident with a vehicle body number acquired from a vehicle-side device, the notification to the emergency call center 12 is permitted, so that it becomes possible to prevent a wrongful use of the device.

LIST OF REFERENCE SIGNS

1: on-vehicle emergency notification device
2: emergency notification unit (DCM)
4: built-in phone
6: auxiliary battery
8: memory
10: automatic notification signal generator
12: emergency call center
14: phone antenna
16: main battery
18: manual notification switch
20: positioning antenna
22: microphone
24: speaker
26: state display indicator
28: audio
30: external tool connection terminal
32: rescue facilities

The invention claimed is:

1. An on-vehicle emergency notification device for performing a notification to an external information center, in the event of an emergency regarding a vehicle or a vehicle occupant, the on-vehicle emergency notification device being configured to allow a vehicle body number and an emergency notification phone number to be registered therein in the form of a set, so as to enable the notification to the information center, wherein the on-vehicle emergency notification device is configured such that: during execution of a factory mode for performing the registration of the vehicle body number and the emergency notification phone number, rewriting of the vehicle body number is permitted; and, after the registration of the vehicle body number and the emergency notification phone number is completed and then the factory mode is shifted to a market mode, a wrongful use of a built-in phone is prevented and the rewriting of the vehicle body number is prohibited, wherein the rewriting of the vehicle body number is prohibited when the on-vehicle emergency notification device receives a receipt signal transmitted from the external information center.

2. The on-vehicle emergency notification device according to claim 1, wherein the factory mode is executed at a dealer, and wherein the on-vehicle emergency notification device is configured such that, when the registration of the vehicle body number and the emergency notification phone number is completed at the dealer, the rewriting of the vehicle body number is prohibited.

3. The on-vehicle emergency notification device according to claim 1, which is configured such that, when a power supply of the vehicle is in an ON state, and the registered vehicle body number is coincident with a vehicle body number acquired from a vehicle-side device, the notification to the information center is permitted.

4. The on-vehicle emergency notification device according to claim 1, which is configured such that, when the vehicle body number and the emergency notification phone number currently transmitted to the information center are coincident, respectively, with a vehicle body number and an emergency notification phone number preliminarily transmitted to the information center, a receipt signal indicative of receipt of the currently-transmitted vehicle body number and emergency notification phone number is received from the information center, and the factory mode is shifted to the market mode.

5. The on-vehicle emergency notification device according to claim 1, which comprises a state display indicator, wherein the on-vehicle emergency notification device is configured such that, when the vehicle body number and the emergency notification phone number currently transmitted to the information center are not coincident, respectively, with a vehicle body number and an emergency notification phone number preliminarily transmitted to the information center, a malfunction is indicated on the state display indicator.

6. The on-vehicle emergency notification device according to claim 1, wherein a warning lamp is blinked on a state display indicator of the vehicle when the vehicle body number is different from the vehicle body number transmitted to the external information center.

* * * * *